US008186947B2

(12) United States Patent
Mathieu (10) Patent No.: US 8,186,947 B2
(45) Date of Patent: May 29, 2012

(54) CONICAL PIN TO MAINTAIN BEARING SYSTEM (75) Inventor: Philippe Mathieu, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 925 days.

(21) Appl. No.: 12/211,761

(22) Filed: Sep. 16, 2008

(65) Prior Publication Data
US 2010/0068053 A1  Mar. 18, 2010

(51) Int. Cl.
*F04D 29/046* (2006.01)
*B23P 15/00* (2006.01)

(52) U.S. Cl. .... 415/229; 415/230; 384/100; 29/888.025

(58) Field of Classification Search .................. 415/113, 415/229, 230; 416/174; 29/888.025
See application file for complete search history.

(56) References Cited

U.S. PATENT DOCUMENTS

| 4,943,170 A * | 7/1990 | Aida ................................ 384/99 |
| 5,993,173 A | 11/1999 | Koike et al. |
| 7,214,037 B2 * | 5/2007 | Mavrosakis ................... 417/407 |

* cited by examiner

*Primary Examiner* — Stephen W Smoot
(74) *Attorney, Agent, or Firm* — Brian Pangrle (57) ABSTRACT

An exemplary locating mechanism for locating a turbine bearing in a bore of a housing includes a conical pin having a pin axis where the conical pin includes a conical wall portion and a pin portion to locate a turbine bearing; a ball; and a socket disposed in a housing and extending between an opening of the housing and a bore of the housing, the socket having a socket axis where the socket includes a cylindrical surface and a conical surface. According to such a mechanism, disposition of the conical pin in the socket seats the conical pin along the socket axis and against the conical surface and disposition of the ball in the socket seats the ball along the socket axis and against the cylindrical surface. Accordingly, alignment of the ball with respect to the conical pin allows for transmission of force from the ball to the conical pin along the pin axis. Various other exemplary technologies are also disclosed.

15 Claims, 6 Drawing Sheets

CONICAL PIN TO MAINTAIN BEARING SYSTEM

TECHNICAL FIELD

Subject matter disclosed herein relates generally to bearing systems for turbomachinery such as turbochargers for internal combustion engines.

BACKGROUND

Turbomachines rely on turbines to convert fluid energy to mechanical energy. In most configurations, a turbine is connected to a shaft supported by one or more bearings where the shaft rotates along with the turbine as the turbine extracts energy from a fluid stream. For exhaust driven turbines, a shaft may rotate at over 100,000 rpm. Such rotational speeds place significant demands on bearing systems, especially as to lubrication and cooling. Often a fluid such as a natural or synthetic oil is used to lubricate as well as cool a bearing system. To ensure adequate fluid flow for lubrication and cooling, clearances between components in a bearing system should be maintained within strict limits.

Various factors impact clearances in a bearing system. These factors include machining accuracy, material properties, assembly techniques and the like. If a component cannot be machined reproducibly and accurately, then clearances may deviate from component to component and collectively from assembly to assembly. Further, if material properties allow for unacceptable wear, which may generate debris, clearances can change over time. Yet further, if an assembly technique introduces variation, then clearances from assembly to assembly may be unacceptable.

As bearing system quality has a significant impact on operation and longevity, it is important that arrangements, materials and assembly techniques be developed that can improve quality. Various exemplary arrangements, materials and techniques described herein aim to enhance quality while optionally reducing costs (e.g., manufacturing, operational, maintenance, etc.).

BRIEF DESCRIPTION OF THE DRAWINGS

A more complete understanding of the various arrangements, techniques, etc., described herein, and equivalents thereof, may be had by reference to the following detailed description when taken in conjunction with the accompanying drawings wherein.

DETAILED DESCRIPTION

Turning to the drawings, various methods are illustrated as being optionally implemented in a suitable control and/or computing environment, for example, in the general context of computer-executable instructions, such as program modules, being executed by a computer and/or other computing device. Generally, program modules include instructions, routines, programs, objects, components, data structures, etc. One or more computer-readable media may be used to store such information. One or more machines may, at least in part, be programmed or otherwise instructed to perform part or all of various methods described herein.

In some diagrams herein, various algorithmic acts are summarized in individual "blocks". Such blocks describe specific actions or decisions that are made or carried out as a process proceeds. Where a controller (or equivalent) is employed, the flow charts presented herein provide a basis for a "control program" or software/firmware that may be used by such a controller (or equivalent) to control a device and/or a system. As such, various processes may be implemented as machine-readable instructions storable in memory that, when executed by a processor, perform various acts illustrated as blocks. In addition, various diagrams include individual "blocks" that are optionally structural elements of a device and/or a system. For example, a "controller block" optionally includes a controller as a structural element.

Those skilled in the art may readily write such a control program based on the flow charts and other descriptions presented herein. It is to be understood and appreciated that the subject matter described herein includes not only devices and/or systems when programmed to perform various acts described below, but the software that is configured to program the controllers and, additionally, any and all computer-readable media on which such software might be embodied. Examples of such computer-readable media include, without limitation, floppy disks, hard disks, CDs, RAM, ROM, flash memory and the like.

Figure 1:
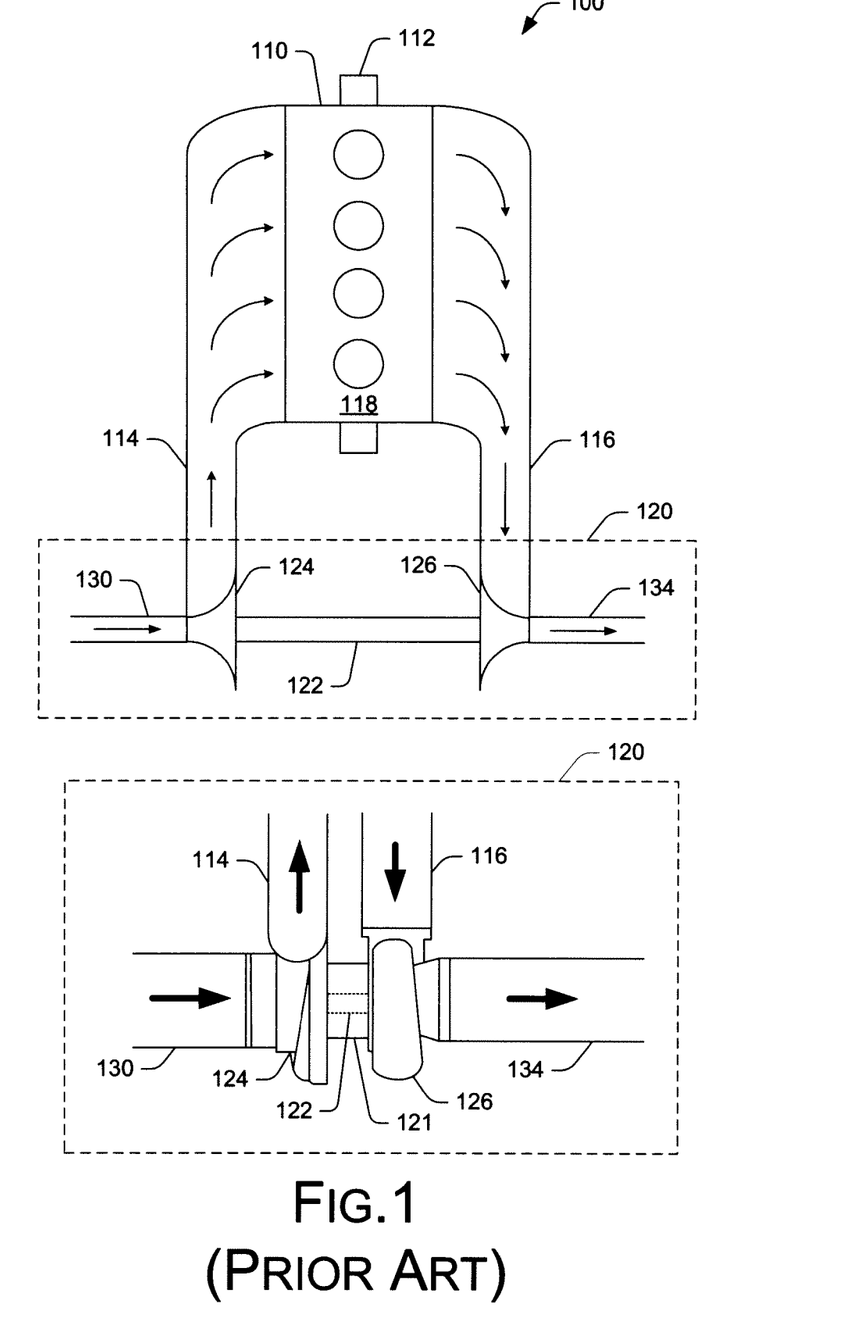
FIG. 1 is a simplified approximate diagram illustrating a prior art turbocharger system for an internal combustion engine.

Turbochargers are frequently utilized to increase the power output of an internal combustion engine. Referring to FIG. 1, a prior art power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 130, a shaft 122, a compressor stage 124, a turbine stage 126 and an exhaust outlet 134. The turbine stage 126 optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology. The compressor stage 124 optionally includes features to control the flow of intake air (e.g., variable geometry compressor).

Figure 2:
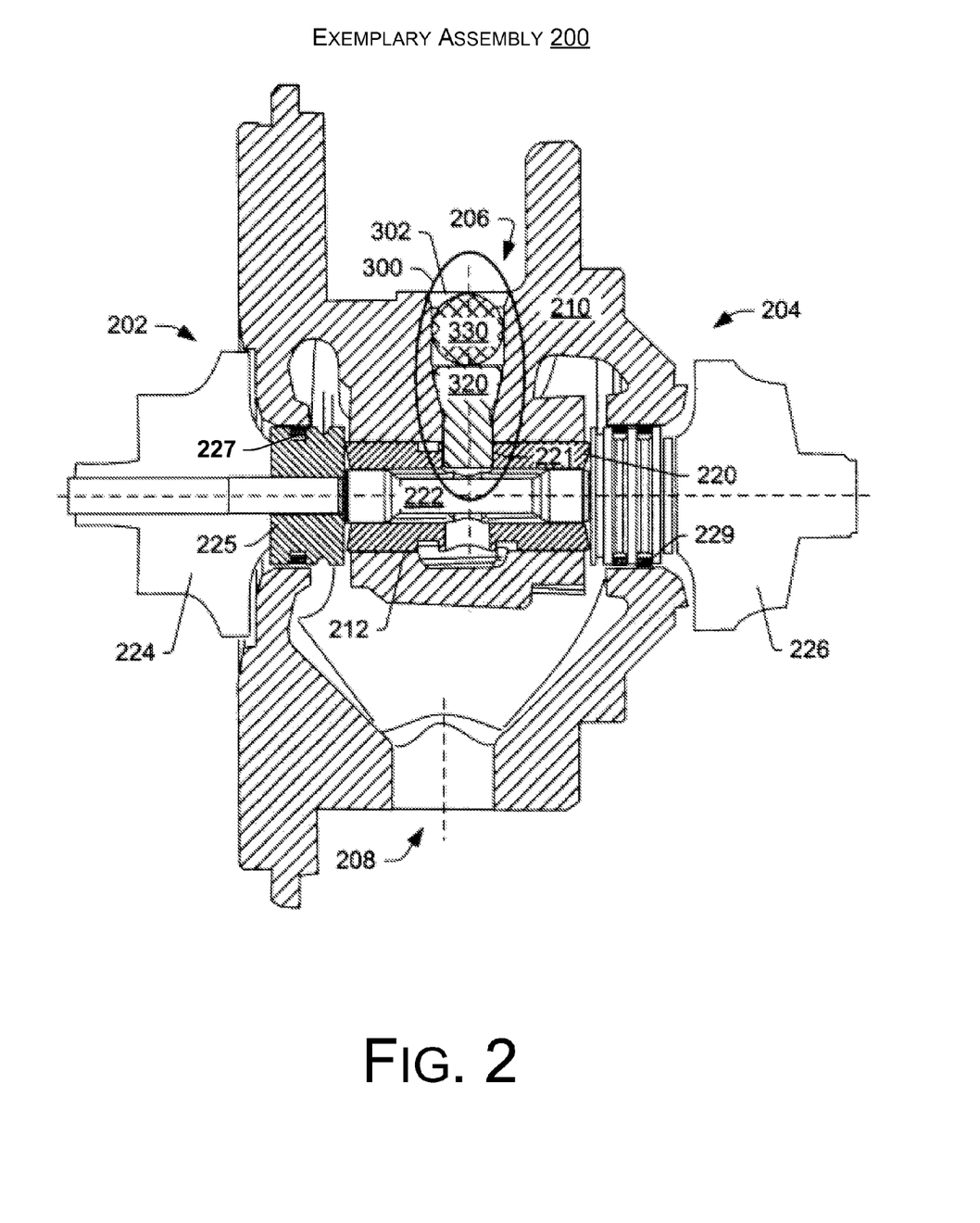
FIG. 2 is cross-sectional view of an assembly with an exemplary bearing system suitable for use with the internal combustion engine of FIG. 1.

In general, the turbine stage 126 includes a turbine wheel (see, e.g., the wheel 226 of FIG. 2) housed in a turbine housing and the compressor stage 124 includes a compressor wheel (see, e.g., wheel 224 of FIG. 2) housed in a compressor housing where the turbine housing and compressor housing connect directly or indirectly to a center housing 121 (see also housing 210 of FIG. 2). The center housing 121 typically houses one or more bearings that rotatably support the shaft 122, which is optionally a multi-component shaft.

FIG. 2 shows an exemplary assembly 200 that includes a housing 210 having a compressor end 202 and a turbine end 204. In this example, the housing 210 is a center housing of a turbocharger assembly such as the housing 121 of FIG. 1. The housing 210 houses an exemplary bearing locating mechanism 300 for a bearing 220. In the example of FIG. 2, the mechanism 300 relies on a locating mechanism socket 302 configured to receives a pin 320 and a ball 330. These features are described in more detail below.

The turbine wheel 226 and the shaft 222 may be a single component, for example, manufactured by welding a turbine to a shaft. Whether a single component or multi-component configuration is used, one or more sealing mechanisms exist to reduce leakage of lubricant from the bearing space to the turbine wheel space. For example, the turbine wheel 226 includes a pair of axially spaced grooves where each groove seats a seal ring 229. In the example of FIG. 2, the compressor wheel 224 is spaced axially from the bearing 220 by a spacer 225, which includes a groove that seats a seal ring 227. Such a seal mechanism reduces leakage of lubricant toward the compressor wheel 201.

The housing 210 includes a bearing bore 212 for the bearing 220. To cooperate with the exemplary locating mechanism 300, the bearing 220 includes an aperture 221 for receiving a locating pin 320 that extends into the bearing bore 212. In such a manner, the bearing 220 can be constrained from rotating and translating in the bearing bore 212 of the center housing 210. In general, once arranged in conjunction with the housing 210, the bearing 220 is semi-floating and has, to some extent, freedom of movement from end to end and within a clearance between the bearing 220 and the bore 212. While the locating mechanism 300 includes features that may, at first, appear to limit such movement, attention to desired clearances and locating mechanism(s) specifics can provide for some end to end movement while maintaining some clearance for radial lubricant flow between the bearing 220 and the housing 210 at the compressor end 202 of the assembly or at the turbine end 204 of the assembly. In FIG. 2, some clearance may exist between the locating pin 230 and the bearing 220.

Various features of the exemplary locating mechanism 300 pertain to reliability. In the example of FIG. 2, the housing 210 includes an opening 206 to the locating mechanism socket 302, which is configured to receive the locating pin 320 and a ball 330. As explained herein, the locating pin 320 is received by the opening 206 of the housing 210, set in the socket 302 and inserted into the aperture 221 of the bearing 220. The ball 330 is then received by the opening 206, set in the socket 302 and an axial load is applied to the ball 330 to position and secure the locating pin 320. The ball 330 is positioned in the socket 302 such that the load applied to the ball 330 is transferred to the locating pin 320 substantially along its axis. Further, the ball 330 may create a seal about a circumference to thereby prevent debris from entering the opening 206. Such debris could potentially affect the locating pin 320 (e.g., its material, its fit and/or its alignment).

While the example of FIG. 2 shows the locating mechanism 300 at the top of the housing 210, in other arrangements a locating mechanism may be from a side or bottom. Further, an exemplary assembly may optionally include two or more locating mechanisms (e.g., an exemplary mechanism and another type of locating mechanism, two exemplary mechanisms, etc.).

Figure 3:
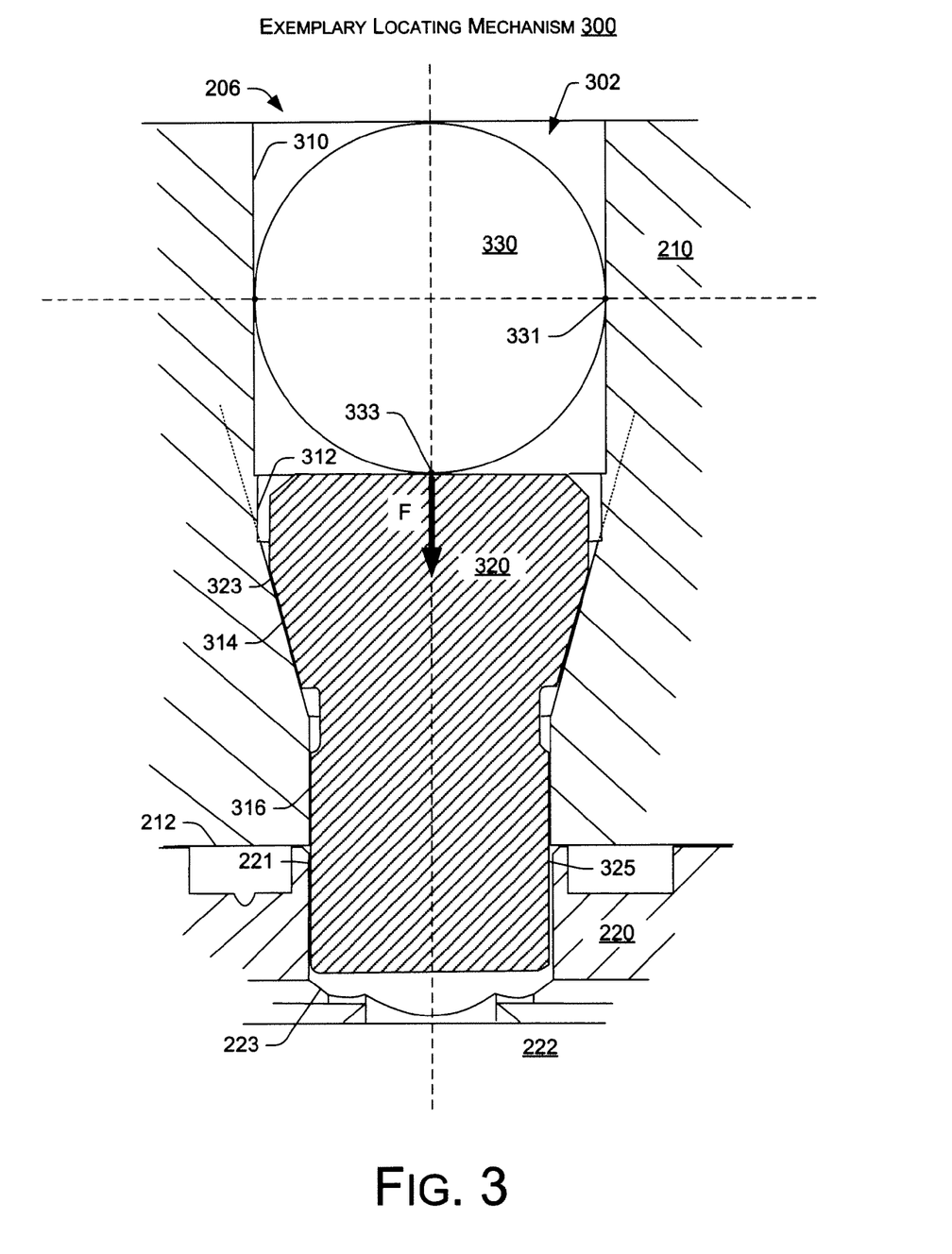
FIG. 3 is an enlarged cross-sectional view of a portion of the assembly of FIG. 2.

FIG. 3 shows an enlarged cross-sectional view of the locating mechanism 300 of FIG. 2. The locating mechanism 300 relies on the socket 302 disposed in the housing 210, the locating pin 320 and the ball 330 to maintain proper alignment of the locating pin 320 with respect to the housing 210 and the bearing 220.

In the example of FIG. 3, the locating pin 320 includes a conical wall portion 323 that aligns with a corresponding conical surface 314 of the socket 302 of the housing 210. The conical wall portion 323 and the conical surface 314 may be relatively smooth to provide increased contact area. The wall portion 323 and/or the conical surface 314 may be alternatively or additionally treated in a manner to increase friction (i.e., the force resisting relative motion of the conical wall portion 323 along the conical surface 314).

In the example of FIG. 3, the conical wall portion 323 is defined with respect to an axis of the pin 320 and the conical surface 314 is defined with respect to an axis of the socket 302. When assembled, these axes are aligned such that conical wall portion 323 of the pin 320 and the conical surface 314 of the socket 302 contact with diminishing diameter along a direction from the opening 206 to the bore 212 of the housing 210 (e.g., from the head to the bottom of the pin 320).

As described herein, application of force along the axis of the pin 320, can seat the conical wall portion 323 of the pin 320 along the conical surface 314 of the socket 302. If disassembly is required, the pin 320 may include one or more features that allow for twisting or pulling the pin 320 from the socket 302 of the housing 210. For example, the pin 320 may include a threaded well along its axis or at an off-axis position (e.g., to not interfere with axial force applied by the ball 330). An exemplary bearing assembly may allow for access to the bottom of the pin 320 where force may be applied to push the pin (e.g., through an opening of the bearing 220, which may be accessed via an opening in a housing).

As shown in FIG. 3, the ball 330 (e.g., sphere) is seated along a cylindrical surface 310 of the socket 302. In this example, the diameter of the ball 330 and the diameter of the cylindrical surface 310 allow the ball 330 to be inserted and pressure fit (e.g., mechanical interference) to form a seal 331 between a circumference of the ball 330 and the cylindrical surface 310. As mentioned, the seal 331 can prevent debris from reaching the pin 320. Additionally, the seal 331 can help prevent leakage of lubricant from the bore 212 of the housing 210; noting that the conical wall portion 323 and the conical surface 314 may form a seal that prevents leakage of lubricant from the bore 212 of the housing 210. Hence, the pin 320 and/or the ball 330 may seal the socket 302 (e.g., to form a seal or seals between the bore 212 and the opening 206 of the housing).

In the locating mechanism 300, the ball 330 and the cylindrical surface 310 may be configured to retain the ball 330 in the socket 302 or they may be configured to allow for removal of the ball 330 (e.g., after seating the pin 320). In either instance, the ball 330 may include one or more features that allow for removal of the ball 330 from the socket 302 (e.g., a threaded well or other feature).

As described herein, the ball 330 allows for transferring force to the pin 320. Specifically, per the arrangement of FIG. 3, the cylindrical surface 310 and conical surface 314 of the socket 302 are defined along a common axis where insertion of the ball 330 into the socket 302 allows the ball 330 to form a contact 333 with the pin 320 along its axis. As force is applied to the ball 330, to seat the pin 320, these axes become aligned with greater accuracy.

In the example of FIG. 3, the pin 320 includes a pin portion 325, which is substantially cylindrical and that extends into the bore 212 of the housing 210 and into the aperture 221 of the bearing 220 to thereby locate the bearing 220 in the bore 212. Such a mechanism can improve the perpendicularity between the pin 320 and the bearing 220. Such a mechanism can also improve hosing cast feasibility, improve aspects of assembly and reduce costs. Improved perpendicularity of the pin 320 to the bearing 220 can reduce wear (e.g., the mechanism helps to maintain proper surface contact between components). As explained, the bearing 220 is often subject to extreme conditions, including high temperature and force. The exemplary locating mechanism 330 improves the relationship between the pin 320 and the bearing 220 and thus allows the bearing 220 to operate with more certainty as to position, which, in turn, can help maintain clearances, maintain lubricant flow and, in general, reduce wear.

Figure 4:
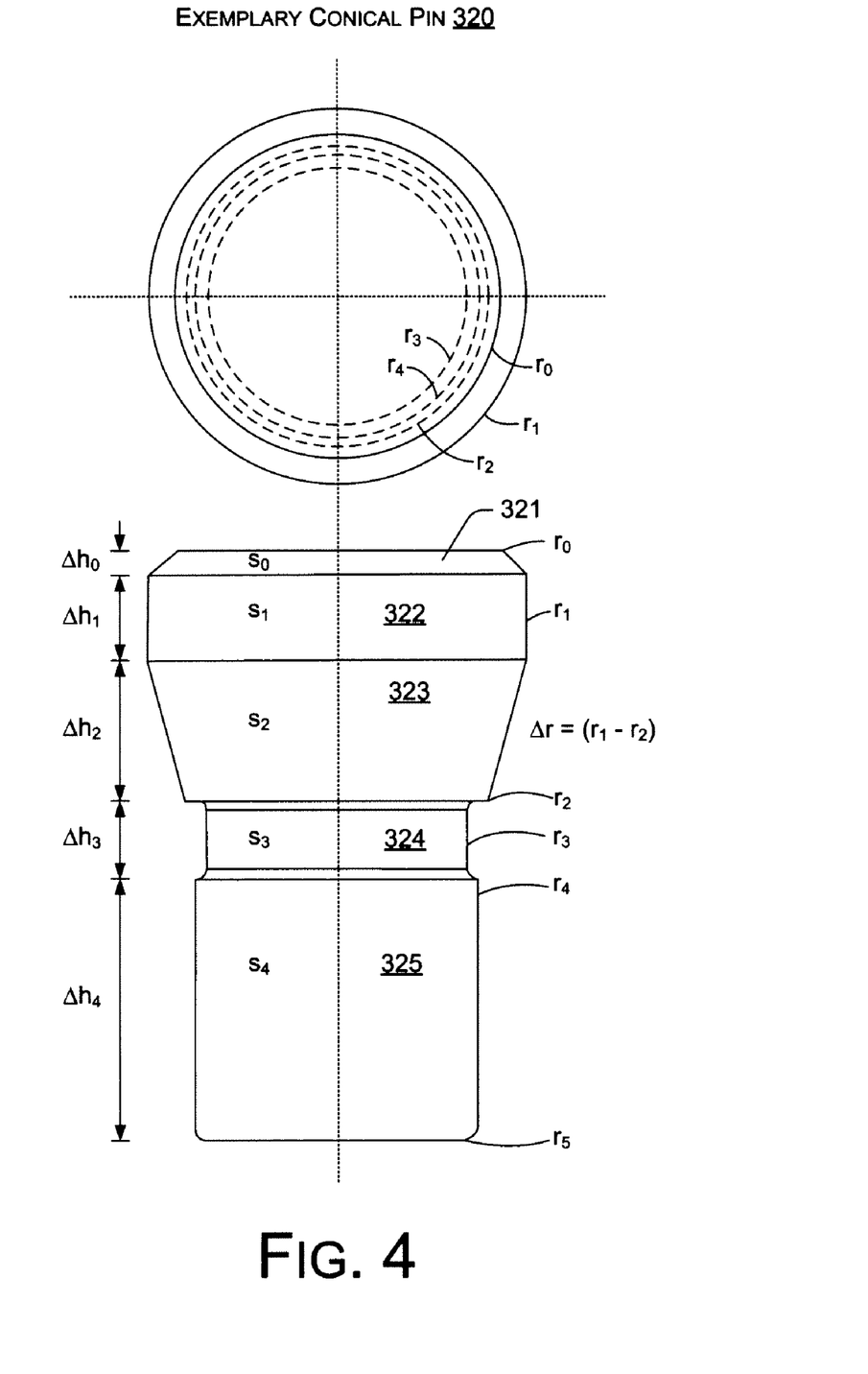
FIG. 4 is a side view and top view of an exemplary conical pin as shown in FIGS. 2 and 3.

FIG. 4 shows a side view and a top view of the conical pin 320 of FIGS. 2 and 3. The pin 320 is described with respect to various portions 321, 322, 323, 324 and 325. These portions are further described with respect to radii, surfaces and axial lengths or "heights".

A beveled portion 321 of the pin 320 has a surface $s_0$, an axial length $\Delta h_0$, an upper radius $r_0$ and a lower radius $r_1$. A cylindrical portion 322 of the pin 320 has a surface $s_1$, an axial length $\Delta h_1$ and a radius $r_1$. The conical wall portion 323 of the pin 320 has a surface $s_2$, an axial length $\Delta h_2$, an upper radius $r_1$ and a lower radius $r_2$. A neck portion 324 of the pin 320 is substantially cylindrical and has a surface $s_3$, an axial length $\Delta h_3$ and a radius $r_3$. The pin portion 325 of the pin 320 is substantially cylindrical and has a surface $s_4$, an axial length $\Delta h_4$, an upper radius $r_4$ and a lower radius $r_5$ (e.g., which may be smaller that $r_4$ due to a beveled edge).

The conical wall portion 323 has a diminishing radius along the axis of the pin 320. A conical angle of the conical wall portion 323 may be determined based on $\Delta r$ and $\Delta h_2$ where $\Delta r=(r_1-r_2)$. In an exemplary arrangement, the conical angle of the conical wall portion 323 may be about 30°. The conical surface 314 of the socket 302 may have an angle of about 30° as well.

Figure 5:
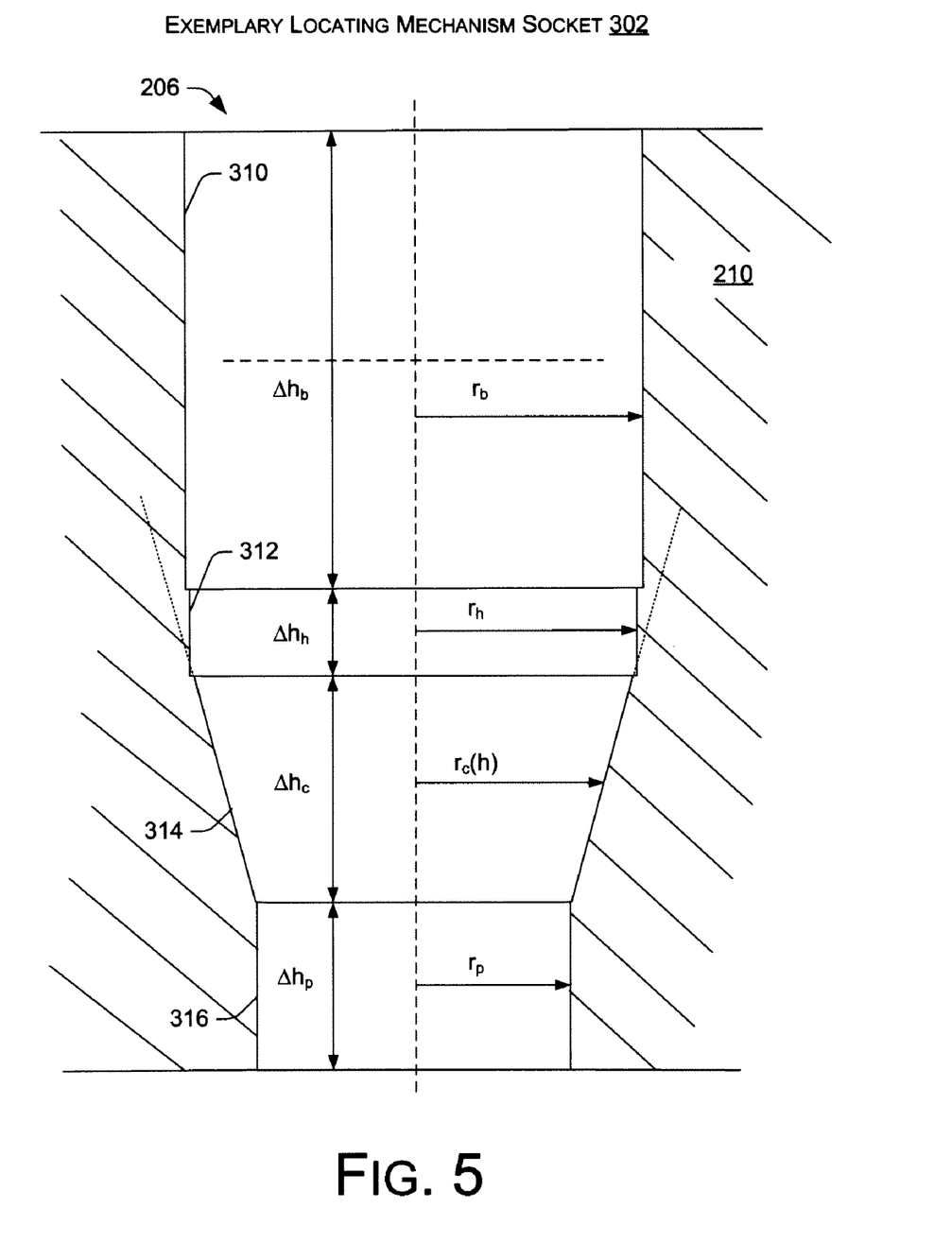
FIG. 5 is a cross-sectional view of an exemplary opening of the center housing of the assembly of FIGS. 2 and 3.

FIG. 5 shows a cross-sectional view of the locating mechanism socket 302. The opening 206 of the housing 210 may be considered an opening of the socket 302. The socket 302 includes the cylindrical surface 310, which has an axial height of $\Delta h_b$ and a radius of $r_b$ (where "b" is an abbreviation of "ball"); a step to a cylindrical surface 312, which has an axial height of $\Delta h_h$ and a radius of $r_h$ (where "h" is an abbreviation of "head" as in pin head); a step to the conical surface 314, which has an axial height of $\Delta h_c$ and a height dependent radius of $r_c(h)$; and the cylindrical surface 316, which has an axial height of $\Delta h_p$ and a radius of $r_p$ (where "p" is an abbreviation of "pin" as in pin portion).

As described herein, an exemplary locating mechanism for locating a turbine bearing in a bore of a housing includes a conical pin having a pin axis and including a conical wall portion and a pin portion to locate a turbine bearing; a ball; and a socket disposed in a housing and extending between an opening of the housing and a bore of the housing, the socket having a socket axis where the socket includes a cylindrical surface and a conical surface, where disposition of the conical pin in the socket seats the conical pin along the socket axis and against the conical surface, where disposition of the ball in the socket seats the ball along the socket axis and against the cylindrical surface, and where alignment of the ball with respect to the conical pin allows for transmission of force from the ball to the conical pin along the pin axis. Such a mechanism may further include the turbine bearing where the turbine bearing has an aperture configured to receive the pin portion of the conical pin.

As described herein, in such a mechanism, a ball may form a seal with a cylindrical surface of a socket. For example, an interference may exist between the ball and the cylindrical surface of the socket defined by a small dimension of about 0.1 mm or less (e.g., approximately 0.05 mm).

As described herein, a conical wall portion of a conical pin may have an angle in a range of about 10° to about 50° (e.g., approximately 30°) with respect to the pin axis. In general, the angle allows for adequate transfer of force and seating; noting that other angles may be possible. As described herein, a socket of a housing can include a corresponding angle.

As described herein, an exemplary assembly for a turbocharger includes a bearing having a longitudinal axis, configured to support a turbocharger shaft along the longitudinal axis and including an aperture having an aperture axis perpendicular to the longitudinal axis; a housing that includes a bore to receive the bearing, and a socket, where the socket extends between an opening of the housing and the bore of the housing, the socket having a socket axis perpendicular to the longitudinal axis of the bearing and where the socket includes a cylindrical surface and a conical surface; a ball disposed in the socket along the socket axis and seated against the cylindrical surface of the socket; and a conical pin, having a pin axis, disposed in the socket along the socket axis and seated against the conical surface of the socket where the conical pin includes a pin portion received by the aperture of the bearing; where the ball contacts the conical pin at the pin axis to thereby allow for transfer of force from the ball to the conical pin. In such an assembly, the conical pin locates the bearing in the bore of the housing. As mentioned, the bearing may be a semi-floating bearing.

Figure 6:
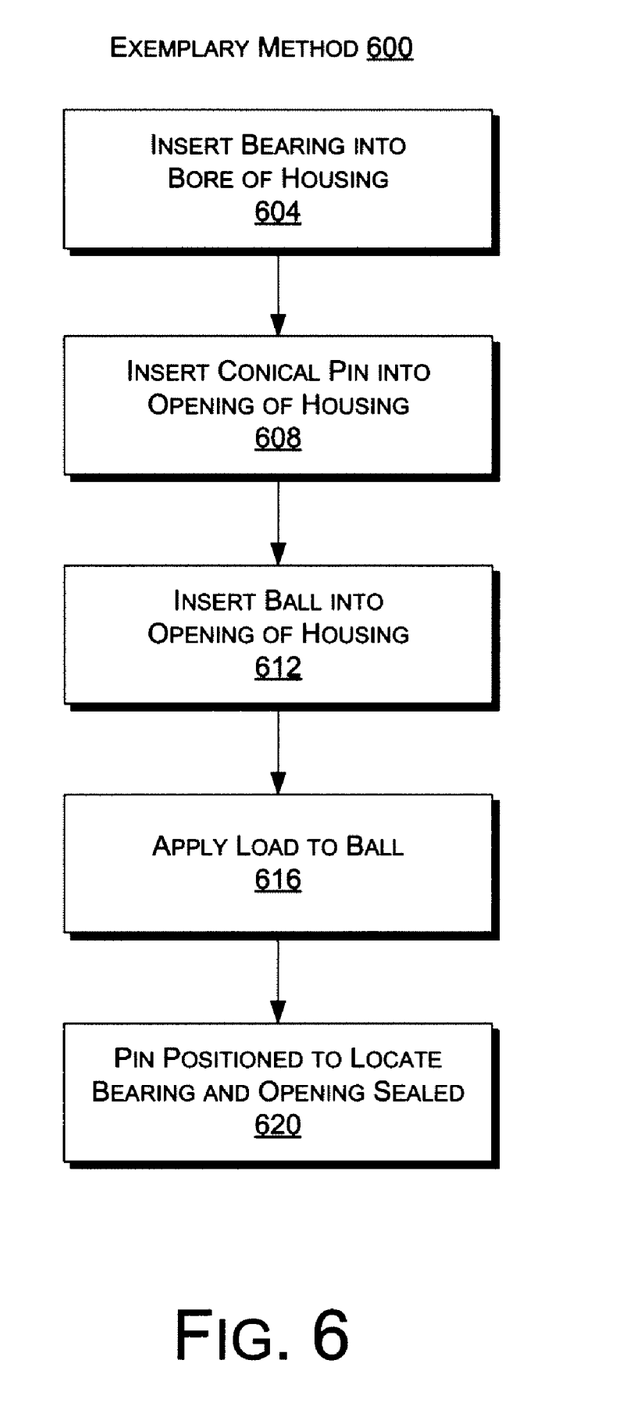
FIG. 6 is a block diagram of an exemplary method for assembling a bearing system.

FIG. 6 shows a block diagram of an exemplary method 600. The method 600 includes an insertion step 604 for inserting a bearing into a bore of a housing. The insertion step 604 is followed by another insertion step 608 for inserting a conical pin into an opening of the housing. While it may be possible to perform the step 608 prior to the step 604, in general, step 608 follows step 604.

The method 600 includes yet another insertion step 612 for inserting a ball into the opening of the housing. The insertion step 612 is followed by an application step 616 for applying a load to the ball. The application step 616 acts to complete the method 600, as indicated by a completion step 620 where the pin is now positioned to locate the bearing and whereby the opening of the housing is now sealed.

As described herein, an exemplary method includes inserting a bearing into a bore of a housing where the bearing includes a longitudinal axis and an aperture, the aperture having an aperture axis perpendicular to the longitudinal axis; inserting a conical pin into a socket of the housing where the socket extends to the bore of the housing and where the conical pin includes a pin axis and a pin portion for receipt by the aperture of the bearing; inserting a ball into the socket of the housing; and applying a load to the ball to thereby seat the conical pin in the socket and locate the bearing in the bore. Such a method may include applying a load to the ball to form a seal between the ball and the socket. As explained, due to proper alignment, application of the load to the ball can transfer force to the conical pin at a point along the pin axis. In various examples, an interference may exist between the socket and the ball to allow the socket to forcibly retain the ball. In such examples, the ball retains the conical pin in the socket.

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A locating mechanism for locating a turbine bearing in a bore of a housing, the locating mechanism comprising:
   a conical pin having a pin axis wherein the conical pin comprises a conical wall portion and a pin portion to locate the turbine bearing;
   a ball; and
   a socket disposed in the housing and extending between an opening of the housing and the bore of the housing, the socket having a socket axis wherein the socket comprises a cylindrical surface and a conical surface,
   wherein disposition of the conical pin in the socket seats the conical pin along the socket axis and against the conical surface,
   wherein disposition of the ball in the socket seats the ball along the socket axis and against the cylindrical surface, and
   wherein alignment of the ball with respect to the conical pin allows for transmission of force from the ball to the conical pin along the pin axis.

2. The locating mechanism of claim 1 further including the turbine bearing wherein the turbine bearing comprises an aperture configured to receive the pin portion of the conical pin.

3. The locating mechanism of claim 1 wherein the ball forms a seal with the cylindrical surface of the socket.

4. The locating mechanism of claim 1 wherein an interference of approximately 0.05 mm exists between the ball and the cylindrical surface of the socket.

5. The locating mechanism of claim 1 wherein the conical wall portion of the conical pin comprises an angle of approximately 30° with respect to the pin axis.

6. The locating mechanism of claim 1 wherein the conical surface of the socket comprises an angle of approximately 30° with respect to the socket axis.

7. An assembly for a turbocharger, the assembly comprising:
   a bearing having a longitudinal axis, configured to support a turbocharger shaft along the longitudinal axis and comprising an aperture having an aperture axis perpendicular to the longitudinal axis;
   a housing that comprises
      a bore to receive the bearing, and
      a socket,
      wherein the socket extends between an opening of the housing and the bore of the housing, the socket having a socket axis perpendicular to the longitudinal axis of the bearing and wherein the socket comprises a cylindrical surface and a conical surface;
   a ball disposed in the socket along the socket axis and seated against the cylindrical surface of the socket; and
   a conical pin, having a pin axis, disposed in the socket along the socket axis and seated against the conical surface of the socket wherein the conical pin comprises a pin portion received by the aperture of the bearing;
   wherein the ball contacts the conical pin at the pin axis to thereby allow for transfer of force from the ball to the conical pin.

8. The assembly of claim 7 wherein the conical pin locates the bearing in the bore of the housing.

9. The assembly of claim 7 wherein the ball forms a seal with the cylindrical surface of the socket to thereby seal the socket.

10. The assembly of claim 7 wherein the bearing comprises a semi-floating bearing.

11. A method comprising:
    inserting a bearing into a bore of a housing wherein the bearing comprises a longitudinal axis and an aperture, the aperture having an aperture axis perpendicular to the longitudinal axis;
    inserting a conical pin into a socket of the housing wherein the socket extends to the bore of the housing and wherein the conical pin comprises a pin axis and a pin portion for receipt by the aperture of the bearing;
    inserting a ball into the socket of the housing; and
    applying a load to the ball to thereby seat the conical pin in the socket and locate the bearing in the bore.

12. The method of claim 11 wherein the applying a load to the ball forms a seal between the ball and the socket.

13. The method of claim 11 wherein the applying a load to the ball transfers force to the conical pin at a point along the pin axis.

14. The method of claim 11 wherein an interference exists between the socket and the ball to allow the socket to forcibly retain the ball.

15. The method of claim 14 wherein the ball retains the conical pin in the socket.

* * * * *